US006951152B2

(12) United States Patent
Strole

(10) Patent No.: US 6,951,152 B2

(45) Date of Patent: Oct. 4, 2005

(54) CRASH RELEASE ARRANGEMENT AND METHOD FOR AN AUTOMOTIVE PEDAL MOUNTING

(75) Inventor: Michael C. Strole, Royal Oak, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 175 days.

(21) Appl. No.: 10/369,092

(22) Filed: Feb. 17, 2003

(65) Prior Publication Data

US 2005/0172754 A1 Aug. 11, 2005

(51) Int. Cl.[7] .............................. G05G 1/14; B60T 7/22

(52) U.S. Cl. ............................ 74/512; 74/560; 74/513; 180/274; 180/275

(58) Field of Search .......................... 74/512, 513, 514, 74/560; 180/274, 275

(56) References Cited

U.S. PATENT DOCUMENTS

| | | | | |
|---|---|---|---|---|
| 5,615,749 | A | 4/1997 | Kato | |
| 5,848,558 | A | 12/1998 | Isono et al. | |
| 6,041,674 | A | 3/2000 | Kato | |
| 6,055,883 | A | 5/2000 | Kato | |
| 6,112,616 | A | 9/2000 | Schonlau et al. | |
| 6,176,340 | B1 * | 1/2001 | Mizuma et al. | 180/274 |
| 6,289,763 | B1 | 9/2001 | Rixon et al. | |
| 6,810,766 | B2 * | 11/2004 | Mizuma | 74/512 |
| 2002/0043125 | A1 * | 4/2002 | Oono et al. | 74/512 |
| 2004/0031350 | A1 * | 2/2004 | Williams et al. | 74/560 |

FOREIGN PATENT DOCUMENTS

| | | | | |
|---|---|---|---|---|
| EP | 1 038 720 | A2 * | 9/2000 | 74/512 |
| EP | 1 065 114 | A1 | 1/2001 | |
| GB | 2 353 009 | A | 2/2001 | |
| GB | 2 389 083 | A * | 12/2003 | 74/512 |
| JP | 10-338108 | * | 12/1998 | 74/512 |

* cited by examiner

*Primary Examiner*—Vinh T. Luong
(74) *Attorney, Agent, or Firm*—Jack Benefiel Law Offices; Dean B. Watson

(57) ABSTRACT

An arrangement and method for releasing an automotive pedal in a crash includes mounting a pedal pivot pin by separable housing pieces fit to the pin to support the pedal for normal operation. One of the housing pieces is hinged to be able to swing away when disconnected from the other housing piece in a crash to release the pedal. The housing pieces are held together by locking clips gripping abutting upper portions of the housing pieces, the clips in turn held in position by a blocking portion of a retainer which is shifted in a crash to allow the clips to disengage. The surfaces gripped by the clips are sloped so that a reaction force on the pin creates a disengaging force on the clips to produce a very rapid release of the clips when the retainer is shifted in a crash. The retainer is located in its clip retention position by locating elements which are sheared off in a crash.

9 Claims, 4 Drawing Sheets

CRASH RELEASE ARRANGEMENT AND METHOD FOR AN AUTOMOTIVE PEDAL MOUNTING

BACKGROUND OF THE INVENTION

This invention concerns pedal pivot mountings for automotive vehicles which are released in a crash. It has long been recognized that a driver of a vehicle can be injured during a frontal crash by the collapse of structure at the front end of the vehicle to which the brake pedal is mounted, pushing the pedal back into the driver's foot. Typically, the driver has forcibly depressed the brake pedal (or, less often, the clutch pedal) during a crash so that the driver is holding his or her foot and leg down rigidly against the pedal. Large forces can thus be transmitted back through the driver's foot and leg, sufficient in some circumstances to cause severe injuries.

In an effort to avoid this, arrangements have been devised in the past to either cause the brake pedal mount to be shifted away during a crash by a controlled deformation of a pivot mount support, or to completely release the pivot mount itself to allow the pedal to drop away in a crash.

It is critical that the pedal be released very quickly to avoid injuries to the driver, and designs which rely on deformation of the vehicle structure to move the pivot away may sometimes act too slowly to avoid such injuries.

The prior pedal releasing designs have relied on spring forces to disconnect the components which also may act too slowly due to the inertia of the parts, and the springs necessary also add complexity and increase the cost to manufacture such designs.

It is therefore the object of the present invention to provide an arrangement and method for releasing a pedal pivot mounting when a frontal crash occurs which does not require a spring to release the pedal, and which very quickly and reliably releases the pedal pivot mounting during a crash event which would otherwise force the pedal back into the driver's foot.

SUMMARY OF THE INVENTION

The above recited object and others which will be understood upon a reading of the following specification and claims are achieved by mounting the pivoted end of the brake pedal to a two piece pivot housing, with an outer housing piece separable from a fixed housing piece by being hinged to be swingable away from the fixed housing piece. The outer housing piece is normally held in position swung up against the fixed housing piece by a pair of angled locking clips capturing abutting portions of top portions of the two housing pieces. In this position, mounting pin ends are captured to be rotatable within a bore formed by complementary semicircular recesses in the two pivot housing pieces, allowing normal pedal motion to operate the brakes (or clutch if used on a clutch pedal).

The locking clips are held in position by a slidable retainer plate having portions normally extending over the locking clips to retain the same in this locking engagement with the pivot housing top portions.

The retainer plate in turn is located in that position on a mounting bracket by frangible tabs on one of these parts projecting into openings in the other part.

The retainer plate has one end positioned against a stable fixed vehicle structure such as a cross member such that, in a frontal crash, upon deformation of less stable structure to which the mounting bracket is fixed, the mounting bracket is shifted rearwardly relative to the retainer plate, shearing the tabs holding the retainer plate in its normal position. This movement also relatively shifts the retainer plate to a nonaligned position at which the locking clips are uncovered. The locking clips engage sloping surfaces on the top portions of pivot housing pieces such as to be urged up by the pedal reaction forces acting on the mounting pin ends acting to urge the hinged housing piece away from the fixed pivot housing piece, to release the top portions thereof, and allow the pin and pedal to be instantly released.

DETAILED DESCRIPTION

Figure 1:
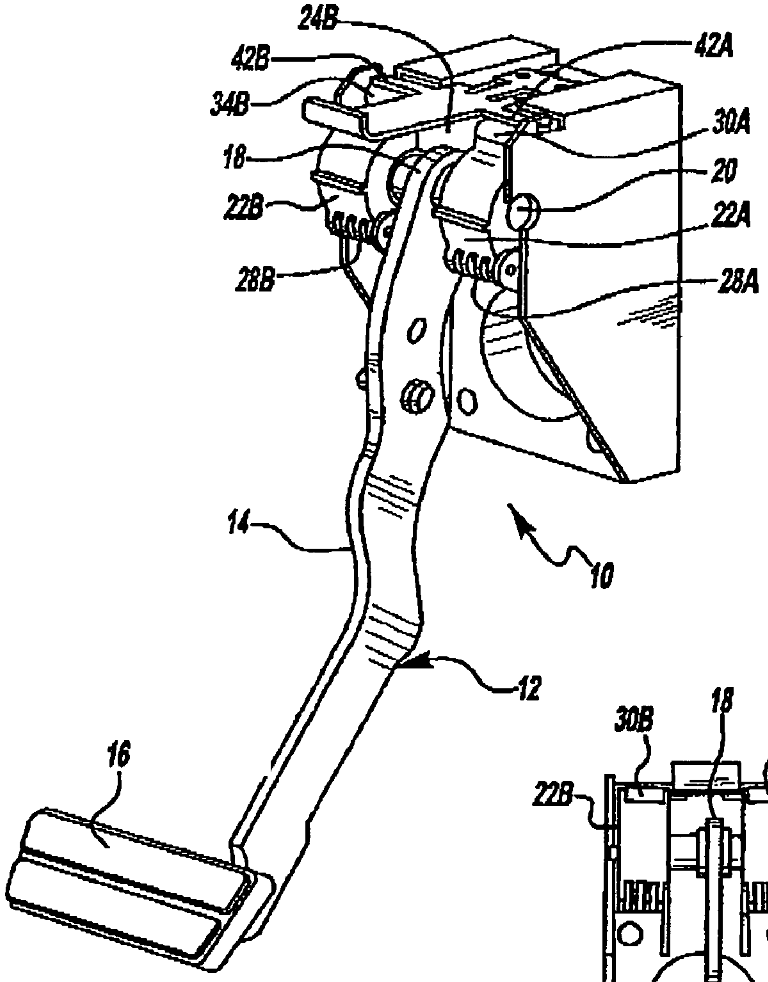
FIG. 1 is a perspective view of a brake pedal and mounting bracket assembly according to the present invention.
Figure 3:
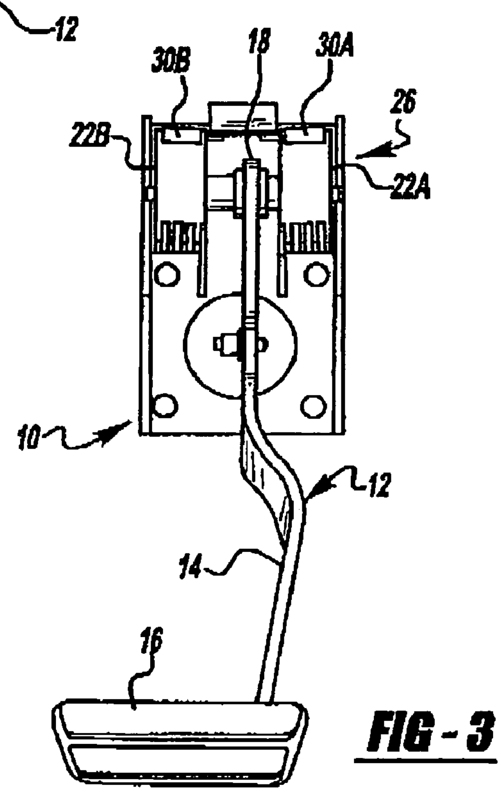
FIG. 3 is a front elevational view of the assembly shown in FIGS. 1 and 2.
Figure 1A:
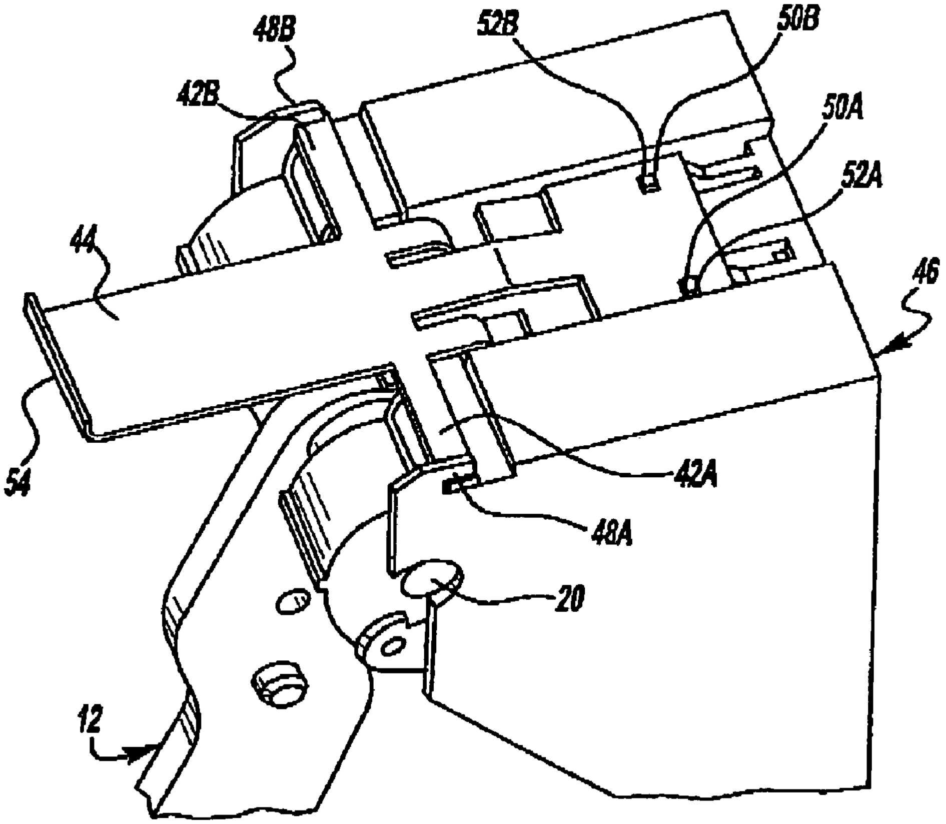
FIG. 1A is an enlarged fragmentary perspective view of the top of the assembly shown in FIG. 1.
Figure 4:
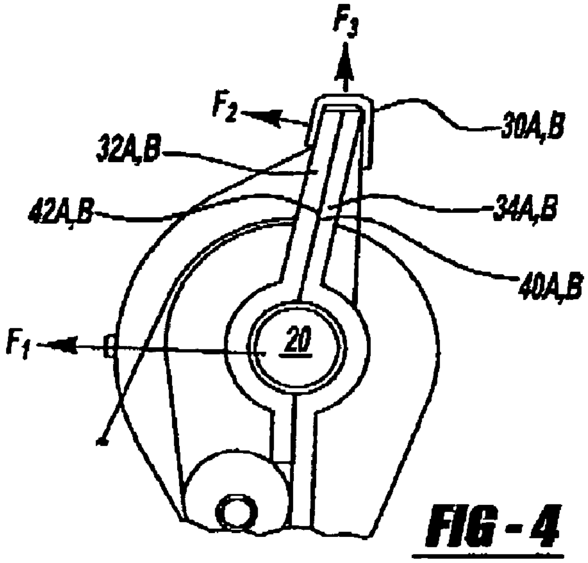
FIG. 4 is an enlarged fragmentary end view of the pivot housing included in the assembly of FIGS. 1–3.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, a brake pedal mounting installation 10 according to the invention is shown in FIGS. 1–7. The installation 10 includes a pedal 12 comprised of an elongated member 14 having a foot engageable pad 16 at one end and a pivotally mounted upper end 18. The upper end 18 is pivotally mounted by opposite mounting pin ends 20 received in respective sets of separable pivot housing pieces 22A, 24A, and 22A, 24B together forming a part of a mounting bracket assembly 26. A brake booster 25 is operated by the pedal 12 to operate the brakes (not shown) in the well known manner.

The outside movable pivot housing pieces 22A, 22B are movable away from the other associated fixed pivot housing pieces 24A, 24B by means of hinged connections 28A, 28B at their lower ends.

Figure 7:
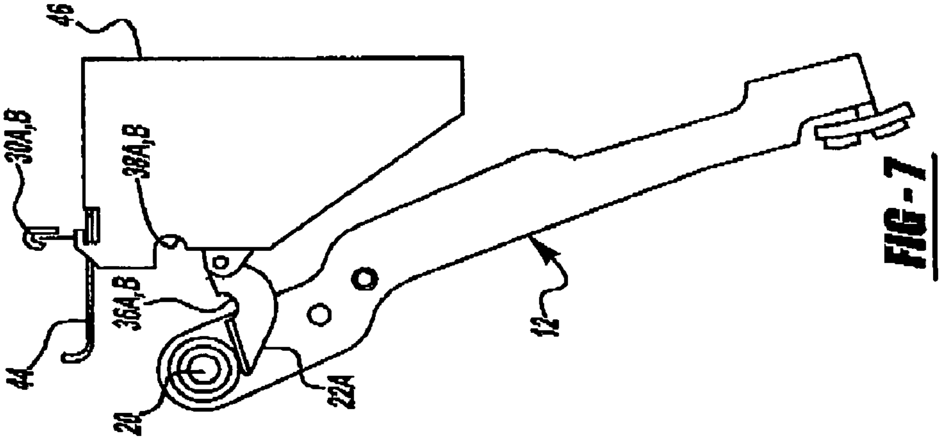
FIG. 7 is a side elevational view of the assembly shown in FIGS. 1–3, with the locking clips disengaged and the movable pivot housing piece swung down to free the pedal.
Figure 6:
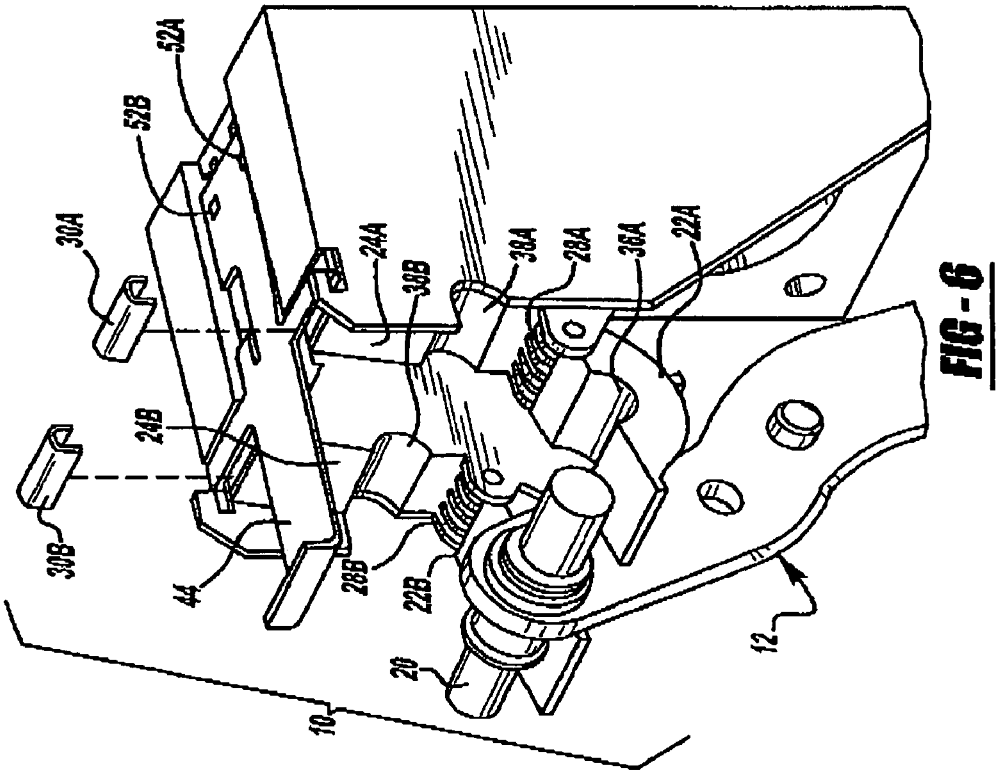
FIG. 6 is an enlarged perspective view of the assembly shown in FIG. 5 with the locking clips disengaged and the movable pivot housing piece swung down to free the pedal.

The movable housing pieces 22A, 22B are normally held in abutment against their associated fixed pivot housing pieces 24A, 24B by locking elements, here comprised of locking clips 30A, 30B received over abutting upper flange portions 32A, 32B and 34A, 34B of the respective pivot housing pieces 22A, 22B, 24A, 24B to capture the pin ends 20 within semicircular recesses 36A, 36B, 38A, 38B formed therein (FIGS. 6 and 7).

The abutting surfaces 40A, 40B of the upper flange portions 32A, 32B, 34A, 34B are sloping with respect to the abutting surfaces 40A, B, 42A, B (FIG. 4) so that the pin reaction force F1 creates a force F2 normal to the surfaces 40A, B, 42A, B, the slope in turn generating an upward force F3 on the clips 30A, B tending to force the clips 30A, B free of the upper flange portions 32A, B, 34A, B, as a result of a strong pedal pressure applied by a driver.

The locking clips 30A, 30B are normally held in their locking position by overlying aligned blocking portions 42A, 42B of a retainer plate 44 slidably secured to the top of a bracket housing 46.

The overlying portions 42A, B are movable horizontally in slotted ears 48A, 48B to a nonaligned release position, but are normally prevented from doing so by integral frangible locator tabs 50A, 50B projecting from one of the members, i.e., the top of the housing 46 received in openings 52A, 52B in the other of these members, i.e., retainer plate 40, aligned therewith when the retainer plate 40 is in its clip retaining rear position.

Figure 2:
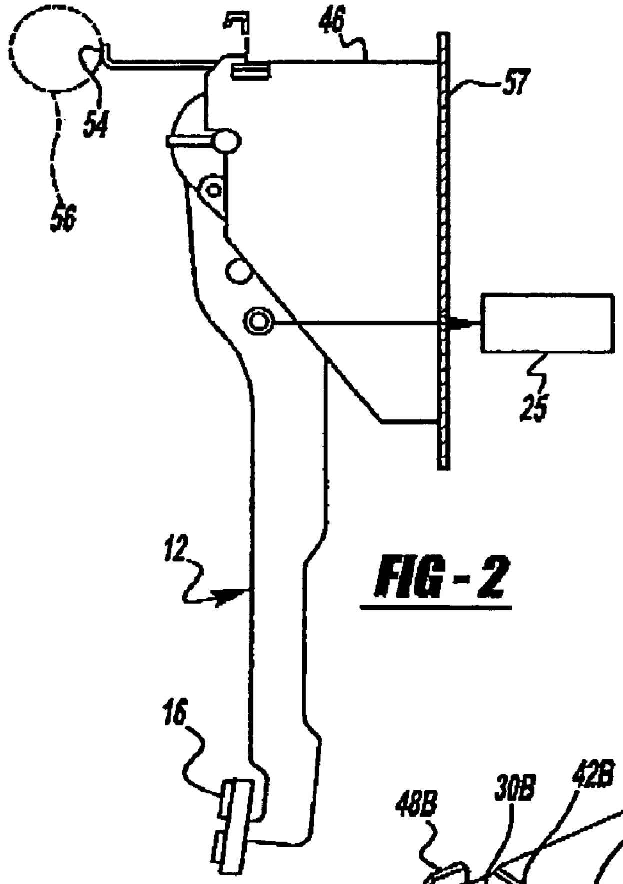
FIG. 2 is a side elevational view of the assembly shown in FIG. 1 with a diagrammatic representation of associated components.

The retainer plate 40 has an upturned rear edge 54 positioned against relatively stable vehicle structure such as a cross member 56 (FIG. 2). In a severe vehicle crash, the less stable body structure 57 typically supporting the mounting bracket 46 may be initially displaced relative the cross beam 56 to endanger the driver's foot and leg engaging the brake pedal 10.

Figure 5:
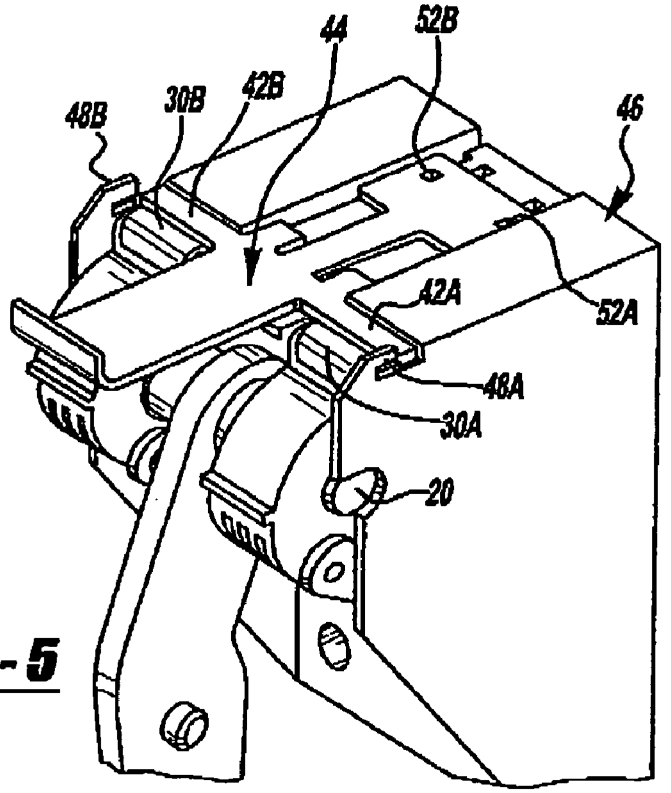
FIG. 5 is an enlarged fragmentary perspective view of the top portion of the assembly shown in FIGS. 1–3 with the retainer plate shifted to the nonaligned position.

This relative displacement of these respective structures shifts the retainer plate 44 relative the housing 46, shearing off the locator tabs 50A, B in the process (FIG. 5).

This causes the locking clips 30A, B to be uncovered, and to immediately be dislodged (FIGS. 6 and 7). The reaction force F1 also causes the movable pivot housing pieces 22A, 22B to swing down, releasing the pin ends 20 and the brake pedal 12 itself so as to prevent the transmission of forces into the driver's foot and leg.

The releasing action is almost instantaneous and is achieved by a relatively simple structure.

Figure 8:
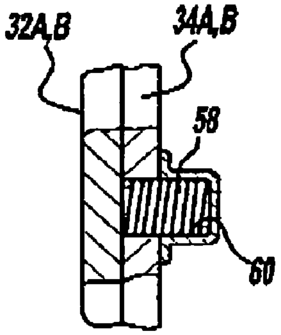
FIG. 8 is an enlarged partially sectional view of top portions of the pivot housing pieces showing a modification thereof.

In order to insure a rapid release even if the driver is not applying pedal pressure, compression springs 58 (FIG. 8) can be provided interposed between top flange portions 32A, B, 34A, B and held with a fixed cap 60 so that these portions are always urged apart regardless of the driver's foot position.

What is claimed is:

1. A release arrangement in combination with an automotive pedal installation in an automotive vehicle, said installation comprising:

- a mounting bracket mounted to a normally fixed vehicle structure;
- a pedal having an elongated member and a mounting pin extending through an upper end of said elongated member, said mounting pin rotatably supported by said mounting bracket;
- said release arrangement including at least one pair of separate pivot housing pieces incorporated in said mounting bracket, said pivot housing pieces normally positioned in abutment together and together forming a bore defined by a partially circular cavity on each pivot housing piece aligned with each other when said pivot housing pieces are in abutment, said bore capturing said mounting pin to provide a pivotal support therefore when said pivot housing pieces are in abutment;
- said pair of pivot housing pieces being normally held together by locking element engaging portions of said pivot housing pieces adjacent each other when said pair of pivot housing pieces are in abutment, said locking element retained in engagement with said adjacent portions of said pivot housing pieces by a blocking portion of a retainer, said retainer carried on said mounting bracket so as to be shifted thereon to a predetermined extent by shifting of said normally fixed structure of said automotive vehicle caused by a vehicle collision to cause said blocking portion to move away from said locking element and allow disengagement of said locking element, thereby allowing said pair of housing pieces to separate from each other and release said pin and pedal from said mounting bracket.

2. The combination according to claim 1 wherein said pair of pivot housing pieces are pivoted relative to each other to swing apart upon release of said locking element and wherein said locking element comprises a clip gripping said pivot housing piece adjacent portions thereof to hold said pair of pivot housing pieces in abutment.

3. The combination according to claim 2 wherein said adjacent portions of said pair of pivot housing pieces are sloped with respect to respective abutting surfaces of said pivot housing pieces to urge said clip out of engagement with said housing adjacent portions upon moving away of said retainer blocking portion.

4. The combination according to claim 1 wherein two aligned pairs of pivot housing pieces are provided, each capturing a respective end of said mounting pin when said pivot housing pieces of each pair of pivot housing pieces are in abutment with each other, and a pair of locking elements are provided, each engaging a respective abutting portions of each pair of said pivot housing pieces said retainer having blocking portions engaging a respective element.

5. The combination according to claim 1 wherein said retainer comprises a retainer plate carried by said mounting bracket in a position with said blocking portion thereof normally overlying said locking element and held in said overlying position by a protrusion formed on one of said retainer plate or said mounting bracket interfit in an opening on the other of said retainer plate or said mounting bracket and sheared off upon shifting of said retainer on said mounting bracket caused by said predetermined extent of shift of said normally fixed vehicle structure.

6. The combination according to claim 3 wherein said retainer blocking portion normally overlies said clip to prevent disengagement thereof with said adjacent housing portions until said retainer is shifted by said predetermined extent of shifting of said normally fixed vehicle structure.

7. The combination according to claim 1 further including a compression spring interposed between said adjacent portions of each of said pairs of pivot housing pieces to urge the same apart.

8. The combination according to claim 4 wherein each of said locking elements comprise a clip gripping respective abutting portions of each of said pair of pivot housing pieces.

9. The combination according to claim 1 wherein said retainer has one end abutting a second normally fixed vehicle structure, and wherein said normally fixed vehicle structure to which said mounting bracket is mounted is in a less stable structure than said normally fixed second vehicle structure to cause relative shifting of said mounting bracket causing said retainer to shift on said mounting bracket in a vehicle crash.

* * * * *